United States Patent
Stover et al.

(10) Patent No.: US 10,597,092 B2
(45) Date of Patent: Mar. 24, 2020

(54) WORK VEHICLE AND SUSPENSION SYSTEM FOR USE WITH SAME

(71) Applicant: THE TORO COMPANY, Bloomington, MN (US)

(72) Inventors: Dale A. Stover, Plymouth, MN (US); Alexander E. Hoy, Lake Elmo, MN (US)

(73) Assignee: THE TORO COMPANY, Bloomington, MN (US)

(*) Notice: Subject to any disclaimer, the term of this patent is extended or adjusted under 35 U.S.C. 154(b) by 107 days.

(21) Appl. No.: 15/849,913

(22) Filed: Dec. 21, 2017

(65) Prior Publication Data

US 2019/0193793 A1    Jun. 27, 2019

(51) Int. Cl.
| | |
|---|---|
| *B62D 21/11* | (2006.01) |
| *B62D 25/08* | (2006.01) |
| *B62D 27/06* | (2006.01) |
| *A01D 34/82* | (2006.01) |
| *A01D 67/00* | (2006.01) |
| *A01D 34/66* | (2006.01) |
| *A01D 101/00* | (2006.01) |

(52) U.S. Cl.
CPC .......... *B62D 25/088* (2013.01); *A01D 34/82* (2013.01); *A01D 67/00* (2013.01); *B62D 27/06* (2013.01); *A01D 34/66* (2013.01); *A01D 2101/00* (2013.01)

(58) Field of Classification Search
CPC ...... B62D 25/088; B62D 27/06; A01D 34/82; A01D 2101/00; A01D 34/66
USPC ................ 280/788; 297/216.16, 216.17, 308
See application file for complete search history.

(56) References Cited

U.S. PATENT DOCUMENTS

| | | | |
|---|---|---|---|
| 2,303,567 A | 12/1942 | McWhorter et al. | |
| 2,385,180 A | 9/1945 | Allen | |
| 2,531,572 A * | 11/1950 | Knoedler | A47C 7/441 248/585 |
| 2,538,954 A | 1/1951 | Efromson et al. | |
| 2,558,440 A | 6/1951 | Johnson | |

(Continued)

FOREIGN PATENT DOCUMENTS

| | | |
|---|---|---|
| EP | 0 081 313 A1 | 6/1983 |
| EP | 0 426 510 A1 | 5/1991 |

(Continued)

OTHER PUBLICATIONS

"Grasshopper 620T OPS (Operator Protective Structure) and Seat Assembly." Parts Diagram [online]. The Mower Shop, Inc. 2007 [retrieved Sep. 9, 2015]. Retrieved from the Internet: <URL:www.the-mower-shop-inc.com/620t_2007_ops_seat_assembly.aspx; 4 pages.

(Continued)

*Primary Examiner* — Toan C To
(74) *Attorney, Agent, or Firm* — Mueting, Raasch & Gebhardt, P.A.

(57) ABSTRACT

A suspension system for use with a work vehicle. The suspension system may include a suspension tower to which one or more shock absorbers may attach. The tower may permit the shock absorbers to attach at multiple locations, effectively allowing the angular orientation of the shock absorbers, and thus a suspension characteristic of the suspension system, to be altered. The tower may be movable relative to the vehicle, e.g., for crating/shipping.

26 Claims, 11 Drawing Sheets

(56) References Cited

U.S. PATENT DOCUMENTS

| | | | |
|---|---|---|---|
| 2,573,077 A | | 10/1951 | White et al. |
| 2,707,986 A | | 5/1955 | Johnson |
| 2,800,948 A | | 7/1957 | Omon et al. |
| 2,829,703 A | * | 4/1958 | Knoedler ............... B60N 2/504 248/562 |
| 2,868,273 A | * | 1/1959 | Barrett .................... B60N 2/38 248/424 |
| 2,900,161 A | | 8/1959 | Crede |
| 2,911,207 A | | 11/1959 | Coble, Jr. et al. |
| 2,987,291 A | | 6/1961 | Dyson |
| 2,991,970 A | | 7/1961 | White et al. |
| 3,006,593 A | * | 10/1961 | Plate ...................... B60N 2/502 248/567 |
| 3,177,962 A | | 4/1965 | Bailey |
| 3,358,958 A | | 12/1967 | Russa |
| 3,420,568 A | | 1/1969 | Henriksson et al. |
| 3,732,941 A | | 5/1973 | Davis et al. |
| 3,756,552 A | * | 9/1973 | Wilhelms ............... B60N 2/502 248/565 |
| 3,762,761 A | | 10/1973 | Erickson |
| 3,770,235 A | | 11/1973 | Klapproth et al. |
| 3,788,412 A | | 1/1974 | Vincent |
| 3,894,451 A | | 7/1975 | Putsch |
| 3,994,469 A | * | 11/1976 | Swenson ................ B60N 2/502 248/585 |
| 4,057,214 A | | 11/1977 | Harder, Jr. |
| 4,062,585 A | | 12/1977 | Herring, Jr. |
| 4,103,858 A | * | 8/1978 | Swenson .................... B62J 1/02 248/421 |
| 4,141,429 A | | 2/1979 | Hale |
| 4,215,841 A | | 8/1980 | Herring, Jr. |
| 4,235,471 A | | 11/1980 | Tengler |
| 4,286,777 A | | 9/1981 | Brown |
| 4,291,857 A | | 9/1981 | Totten et al. |
| 4,311,204 A | | 1/1982 | Shupert |
| 4,351,556 A | | 9/1982 | Worringer |
| 4,392,546 A | | 7/1983 | Brown et al. |
| 4,429,427 A | | 2/1984 | Sklar |
| 4,477,050 A | | 10/1984 | Thompson et al. |
| 4,537,382 A | | 8/1985 | Beck |
| 4,662,597 A | | 5/1987 | Uecker et al. |
| 4,711,423 A | | 12/1987 | Popper |
| 4,944,554 A | | 7/1990 | Gross et al. |
| 5,367,864 A | | 11/1994 | Ogasawara et al. |
| 5,368,118 A | | 11/1994 | Hoefle |
| 5,769,492 A | | 6/1998 | Jensen |
| 5,799,475 A | | 9/1998 | Borling et al. |
| 5,873,224 A | | 2/1999 | Murakawa et al. |
| 5,915,662 A | | 6/1999 | Itakura et al. |
| 5,946,893 A | | 9/1999 | Gordon |
| 6,019,422 A | | 2/2000 | Taormino et al. |
| 6,042,093 A | | 3/2000 | Garelick |
| 6,062,333 A | | 5/2000 | Gordon |
| 6,170,242 B1 | | 1/2001 | Gordon |
| 6,244,025 B1 | | 6/2001 | Ferris et al. |
| 6,394,216 B1 | | 5/2002 | Gordon |
| 6,460,318 B1 | | 10/2002 | Ferris et al. |
| 6,510,678 B2 | | 1/2003 | Ferris et al. |
| 6,572,071 B1 | | 6/2003 | Tsai |
| 6,669,293 B2 | | 12/2003 | Moore |
| 6,688,689 B1 | | 2/2004 | Thorn |
| 6,698,172 B2 | | 3/2004 | Ferris et al. |
| 6,711,885 B2 | | 3/2004 | Ferris |
| 6,719,258 B2 | | 4/2004 | Bryngelson et al. |
| 6,857,254 B2 | | 2/2005 | Melone et al. |
| 6,866,340 B1 | | 3/2005 | Robertshaw |
| 6,988,703 B2 | | 1/2006 | Ropp |
| 7,044,553 B2 | | 5/2006 | Ropp |
| 7,107,746 B2 | | 9/2006 | Melone et al. |
| 7,152,389 B2 | | 12/2006 | Melone et al. |
| 7,374,187 B2 | | 5/2008 | Melone et al. |
| 7,882,914 B2 | | 2/2011 | Scheele et al. |
| 7,930,813 B2 | | 4/2011 | Melone et al. |
| 7,942,224 B2 | * | 5/2011 | Marshall ................... B62K 5/01 180/273 |
| 7,967,282 B2 | | 6/2011 | Boyd et al. |
| 8,033,354 B2 | | 10/2011 | Marshall et al. |
| 8,065,864 B2 | | 11/2011 | Melone et al. |
| 8,146,899 B2 | | 4/2012 | Hiser |
| 8,186,475 B2 | * | 5/2012 | Sugden .................. A01D 34/66 180/326 |
| 8,220,577 B2 | | 7/2012 | Marshall et al. |
| 8,245,806 B2 | | 8/2012 | Newell |
| 8,397,367 B2 | | 3/2013 | Melone et al. |
| 9,499,204 B1 | | 11/2016 | Gust et al. |
| 9,616,837 B1 | | 4/2017 | Bartel et al. |
| 9,821,689 B2 | | 11/2017 | Busboom et al. |
| 2001/0013217 A1 | | 8/2001 | Ferris |
| 2003/0024223 A1 | | 2/2003 | Jager et al. |
| 2005/0082897 A1 | | 4/2005 | Ropp et al. |
| 2005/0279910 A1 | | 12/2005 | Hupriker et al. |
| 2005/0285006 A1 | | 12/2005 | Koutsky et al. |
| 2006/0131799 A1 | | 6/2006 | Carlitz et al. |
| 2008/0202874 A1 | | 8/2008 | Scheele et al. |
| 2009/0140503 A1 | * | 6/2009 | Kolesar ................. B61B 11/008 280/16 |
| 2012/0049039 A1 | | 3/2012 | Scheffler et al. |
| 2013/0291508 A1 | | 11/2013 | Melone et al. |
| 2013/0291509 A1 | | 11/2013 | Weber et al. |
| 2015/0040531 A1 | | 2/2015 | Melone et al. |
| 2016/0031492 A1 | | 2/2016 | Suzuki et al. |
| 2017/0056261 A1 | * | 3/2017 | Vereen, III ............. A61G 5/107 |
| 2018/0251053 A1 | * | 9/2018 | Kemp .................... B60N 2/502 |

FOREIGN PATENT DOCUMENTS

| | | |
|---|---|---|
| EP | 1 645 494 A2 | 4/2006 |
| GB | 774129 A | 5/1957 |
| JP | 55-69340 A | 5/1980 |
| WO | WO 2006/080495 A1 | 8/2006 |

OTHER PUBLICATIONS

"Case IH Steiger Cab Suspension." Product Listing [online]. Case iH Agriculture, 2011 [retrieved Sep. 9, 2015]. Retrieved from the Internet: <URL:beready.caseih.com/available-land/the-new-steiger-tractor-cab-you-asked-for-it-you-got-it/attachment/steiger_cab_suspension_words_flat-2/>; 4 pages (including enlarged image from p. 1).

"5400 Series Cab Suspension." Brochure [online]. Massey Ferguson, 2010 [retrieved on Aug. 8, 2015]. Retrieved from the Internet: <URL: www.masseyferguson.us/content/dam/Brands/Massey%20Ferguson/US/Tractors/MidRange%20Tractors/5400%20Series%20Mid-Range/Literature/massey-ferguson-5400-cab-suspension-tractor-brochure-english.pdf/_jcr_content/renditions/original>, 4 pages.

"A Better Way—Rebound and Terrain Jockey." Unknown publisher. Available on or before Mar. 17, 2014, 1 page.

"Valtra N Series: HiTech/ HiTech 5/ Versu/Direct, 99-171 HP." Brochure [online]. Valtra Inc., 2013 [retrieved on Aug. 17, 2015]. Retrieved from the Internet: <URL:www.valtra.com/downloads/ValtraNSeriesEN_2013.pdf>; 48 pages.

"Skiroule Snowmobile—RT & RTX Series II" Owner's Manual and Maintenance Guide, Form No. 3213-9001, Skiroule Coleman. Printed in Canada circa 1973; 38 pages.

U.S. District Court, ED of Wisconsin, *Metalcraft of Mayville, Inc. v. The Toro Co.*; Case No. 2:16-cv-00544. Decision and Order dated Aug. 1, 2016; 13 pages.

U.S. District Court, ED of Wisconsin, *Metalcraft of Mayville, Inc. v. The Toro Co.*; Case No. 2:16-cv-00544. Decision and Order dated Aug. 18, 2016; 9 pages.

Image of Slip Channel Pliers with D-Shaped pin. Available at least as early as Jul. 24, 2017. 1 page.

* cited by examiner

WORK VEHICLE AND SUSPENSION SYSTEM FOR USE WITH SAME

The present disclosure is directed to work vehicles (e.g., riding lawn mowers) and, more particularly, to suspension systems for use with such vehicles.

BACKGROUND

Riding work vehicles such as skid-steer loaders, tractors, fertilizer spreaders/sprayers, lawn mowers, and the like are known. During operation of these vehicles, undulating terrain may cause various forces to be transmitted through the vehicle chassis and, ultimately, to the riding operator. While the magnitude and duration of such forces may be minimal in some instances, traversal of rough terrain may undesirably expose the operator to numerous and abrupt movements.

Work vehicles have addressed this issue by providing a suspension system operable to attenuate these forces. Depending on the construction of the suspension system, components of the system may protrude outwardly (e.g., upwardly) from other portions of the vehicle as shown in, e.g., U.S. Pat. No. 9,499,204. Portions of suspension systems like those illustrated in the '204 patent could thus (depending on how the mower is dis-assembled for shipping) define uppermost mower structure. As a result, such mowers may require a shipping crate having a height suitable to accommodate the protruding suspension system.

SUMMARY

Embodiments described herein may seek to minimize maximum shipping height of various work vehicles. For instance, in some embodiments, a work vehicle is provided that includes: a chassis supported upon a ground surface by ground contact members, the chassis defining a front end, a rear end, and a longitudinal axis extending between the front and rear ends; a support platform adapted to support an operator; and a suspension system interconnecting the support platform and the chassis. The suspension system includes a suspension tower movable between an operating position and a shipping position.

In another embodiment, a work vehicle is provided that includes: a chassis supported upon a ground surface by a plurality of wheels; a support platform adapted to support an operator; and a suspension system. The suspension system may include: a suspension tower connected to the support platform; and a shock absorber having a first end adapted to connect to the chassis, and a second end connected to the suspension tower. The suspension tower is movable, relative to the support platform, between: an operating position, wherein an uppermost edge of the suspension tower is located at a first elevation; and a shipping position, wherein the uppermost edge of the suspension tower is located at a second elevation lower than the first elevation.

In yet another embodiment, an adjustable suspension system is provided that includes: a structure defining a slot; a shock absorber having an end; and a latch associated with the end of the shock absorber, wherein the latch is adapted to secure the end of the shock absorber at any one of a plurality of locations along the slot. The latch includes a shaft portion extending through the slot, wherein the shaft portion includes a first segment defined by a maximum cross-sectional dimension and a second segment defined by a minimum cross sectional-dimension. The latch is movable between: a latched position, wherein the maximum cross-sectional dimension engages the slot to immobilize the latch relative to the structure; and an unlatched position, wherein the minimum cross-sectional dimension engages the slot to allow movement of the latch along the slot.

The above summary is not intended to describe each embodiment or every implementation. Rather, a more complete understanding of illustrative embodiments will become apparent and appreciated by reference to the following Detailed Description of Exemplary Embodiments and claims in view of the accompanying figures of the drawing.

BRIEF DESCRIPTION OF THE VIEWS OF THE DRAWING

Exemplary embodiments will be further described with reference to the figures of the drawing, wherein.

Figure 1:
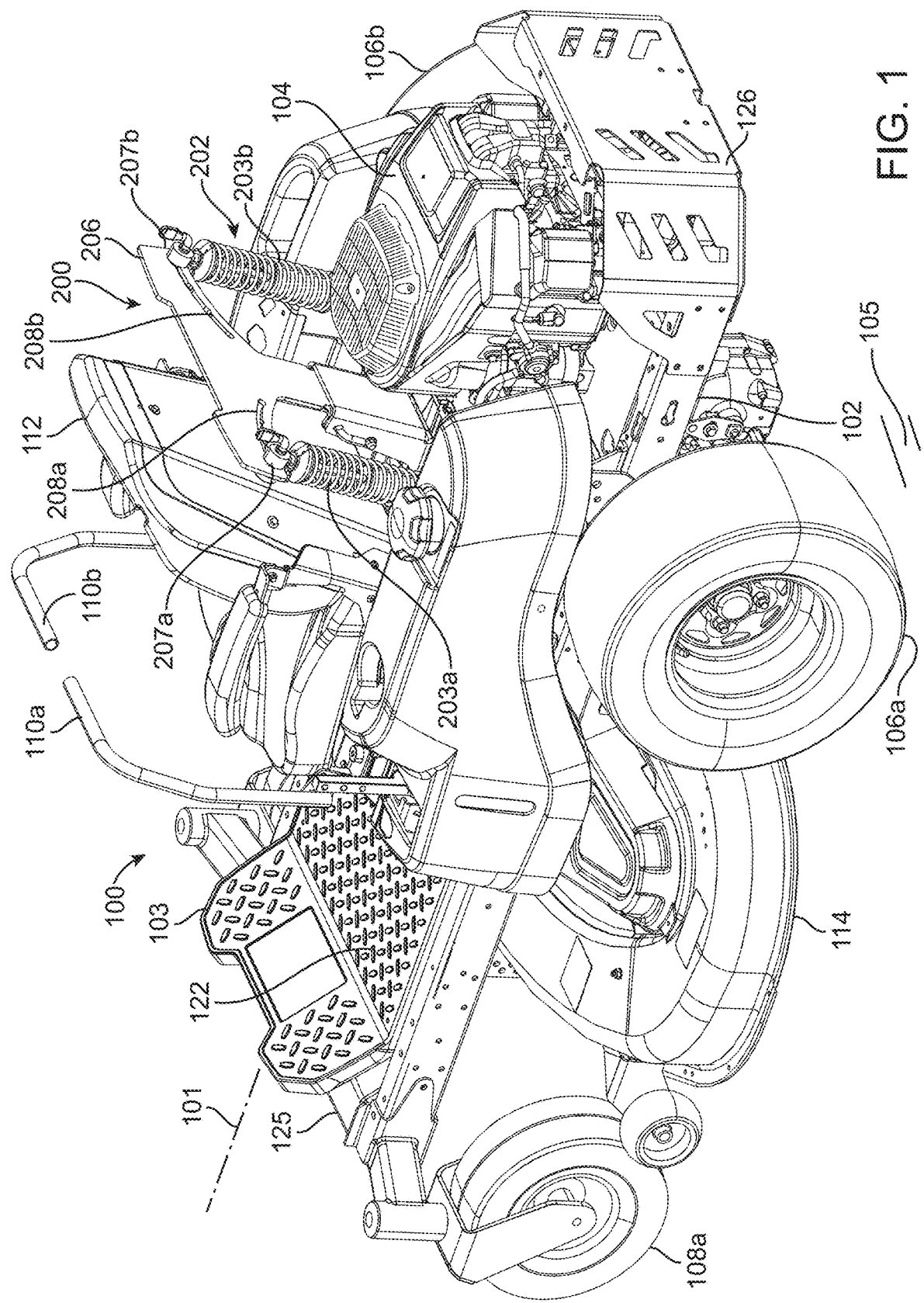
FIG. 1 is a rear perspective view of a work vehicle, e.g., riding lawn mower, including a suspension system having a movable suspension tower in accordance with embodiments of the present disclosure, the tower shown in an operating position.

The figures are rendered primarily for clarity and, as a result, are not necessarily drawn to scale. Moreover, various structure/components, including but not limited to fasteners, electrical components (wiring, cables, etc.), and the like, may be shown diagrammatically or removed from some or all of the views to better illustrate aspects of the depicted embodiments, or where inclusion of such structure/components is not necessary to an understanding of the various exemplary embodiments described herein. The lack of illustration/description of such structure/components in a particular figure is, however, not to be interpreted as limiting the scope of the various embodiments in any way. Still further, "Figure x" and "FIG. x" may be used interchangeably herein to refer to the figure numbered "x."

DETAILED DESCRIPTION OF EXEMPLARY EMBODIMENTS

In the following detailed description of illustrative embodiments, reference is made to the accompanying figures of the drawing which form a part hereof. It is to be understood that other embodiments, which may not be described and/or illustrated herein, are certainly contemplated.

All headings provided herein are for the convenience of the reader and should not be used to limit the meaning of any text that follows the heading, unless so specified. Moreover, unless otherwise indicated, all numbers expressing quantities, and all terms expressing direction/orientation (e.g., vertical, horizontal, parallel, perpendicular, etc.) in the specification and claims are to be understood as being modified in all instances by the term "about."

It is also noted that the term "comprises" and variations thereof do not have a limiting meaning where these terms appear in the accompanying description and claims. Further, "a," "an," "the," "at least one," and "one or more" are used interchangeably herein. Moreover, relative terms such as "left," "right," "front," "fore," "forward," "rear," "aft," "rearward," "top," "bottom," "side," "upper," "lower," "above," "below," "horizontal," "vertical," and the like may be used herein and, if so, are from the perspective shown in the relevant figure(s), or from the perspective of one operating a vehicle (e.g., a mower 100) while the vehicle is in an operating configuration, e.g., while the mower 100 is positioned such that wheels 106 and 108 rest upon a horizontal ground surface 105 as shown in FIG. 1. These terms are used only to simplify the description, however, and not to limit the interpretation of any embodiment described.

Embodiments of the present disclosure are directed to a ride-on work vehicle that includes a chassis or frame supported upon a ground surface by one or more ground contact members (e.g., wheels). The vehicle may include an operator support platform to support a riding operator (e.g., in an operator's seat) during vehicle operation. Operatively connecting the chassis to the support platform is a suspension system. The suspension system may attenuate forces, e.g., travel-induced forces, which may otherwise be transmitted to the support platform during vehicle operation. Stated another way, the support platform, and thus the operator, may be at least partially isolated from forces imparted to the chassis as a result of vehicle operation. Moreover, portions of the suspension system may collapse to effectively reduce the size (e.g., height) of the vehicle for transport/shipping. As a result, more efficient crating of the vehicle may be accommodated.

With reference to the figures of the drawing, wherein like reference numerals indicate like parts throughout the various figures, FIG. 1 illustrates an exemplary work vehicle 100 including a suspension system 200 in accordance with embodiments of the present disclosure. As stated above, the suspension system 200 may operatively connect a chassis 102 of the vehicle with an operator support platform 103. As a result, the support platform 103 may "float" relative to the chassis 102 via compliance of the suspension system 200. That is to say, the suspension system 200 may allow for relative motion between the support platform 103 and the chassis 102. Again, by selecting the particular characteristics of the suspension system 200, forces that would otherwise be transmitted to the operator during vehicle operation may be attenuated.

While the work vehicle is shown and described herein as a self-propelled riding or ride-on lawn mower (also referred to herein simply as a "mower" or "vehicle"), such a configuration is not limiting. Rather, those of skill in the art will realize that other types of ride-on (e.g., sit-on or stand-on) work vehicles including skid-steer vehicles, aerators, material spreader/sprayers, dethatchers, snow throwers, debris management systems, and tractors, may benefit from the concepts disclosed herein. Accordingly, "work vehicle" is used herein to encompass most any ride-on vehicle used to provide a ground care/maintenance function.

While the general construction of the vehicle is not necessarily central to an understanding of exemplary embodiments, an illustrative work vehicle, e.g., mower 100, is described below, initially with reference to FIG. 1.

The mower 100/chassis 102 may define front and rear ends 125, 126, respectively, with a longitudinal or travel axis 101 extending between the front and rear ends (i.e., the longitudinal axis is the axis of mower travel when the mower is traveling in a straight line). As used herein, a transverse axis or plane is any axis or plane normal to the longitudinal axis 101.

The chassis 102 may support a prime mover (e.g., internal combustion engine) 104, which may, in one embodiment, be located at or near the rear end of the mower 100 as indicated in FIG. 1. Left and right ground-engaging drive members (e.g., rear drive wheels 106a, 106b; see also FIG. 5) may be rotatably coupled to left and right sides respectively, of the chassis 102. Each drive wheel may be powered by the engine 104 to rotate, relative to the chassis 102, about a fixed axis such that simultaneous and equal rotation of the two drive wheels causes the mower 100 to move parallel to (i.e., along) the longitudinal axis 101. In one embodiment, the mower 100 may be configured as a zero-turn-radius (ZTR) vehicle, wherein the drive wheels 106 are independently driven by the engine 104 (e.g., via one or more hydraulic motors/pumps, hydrostatic transmissions, or the equivalent). While described herein as an internal combustion engine 104, other embodiments could utilize other prime movers, e.g., one or more electric motors, to power the drive wheels 106. Moreover, while illustrated as wheels 106, other embodiments may utilize other drive members (e.g., tracks or the like) without departing from the scope of this disclosure.

The suffixes "a" and "b" may be used throughout this description to denote various left- and right-side parts/features, respectively. However, in most pertinent respects, the parts/features noted with "a" and "b" suffixes may be substantially identical to, or mirror images of, one another. It is understood that, unless otherwise noted, the description of an individual part/feature (e.g., part/feature identified with an "a" suffix) also applies to the opposing part/feature (e.g., part/feature identified with a "b" suffix). Similarly, the description of a part/feature identified with no suffix may apply, unless noted otherwise, to both the corresponding left and right part/feature.

The mower 100 may additionally include one or more, e.g., two, support members or wheels 108 (only left wheel 108a is visible in FIG. 1, but right wheel 108b is generally identical). In the illustrated embodiment, the support wheels 108 are caster wheels and are located forward of the drive wheels 106 (e.g., during normal forward travel of the mower) and are thus referred to herein as "front" wheels (however, such a configuration is not limiting as, for example, the positions of the drive wheels and support wheels could be reversed). Accordingly, the rear drive wheels 106 and front support wheels 108 may support the mower 100 in rolling engagement with the ground surface 105. While described herein as utilizing two rear drive wheels and two front castering wheels, such a configuration is merely exemplary. For example, other embodiments may use more or less wheels (e.g., a tri-wheel configuration), while still other embodiments may provide different drive wheel configurations (e.g., front-wheel drive or all-wheel drive) or different steering configurations (e.g., a vehicle with conventional Ackermann-type steering).

The mower 100 may further include one or more controls, e.g., left and right drive control levers 110a, 110b. The drive control levers 110 may be pivotally coupled to the mower 100 (e.g., to the chassis 102) such that the levers may independently pivot forwardly and rearwardly (e.g., about a transverse axis) under the control of an operator positioned upon the support platform 103 that, in one embodiment, includes an operator seat 112. Via incremental pivoting, each drive control lever 110 is operable to control the speed and direction of its corresponding drive wheel 106 (e.g., the left lever 110a may control proportionally the speed and rotational direction of the left drive wheel 106a, while the right lever 110b may control proportionally the speed and rotational direction of the right drive wheel 106b) via manipulation of the mower's drive system. While illustrated herein as incorporating separate drive control levers 110, other controls, e.g., single or multiple joysticks or joystick-type levers, touchpads, steering wheels, foot pedals, etc. could also be used to control one or both of mower speed and direction.

A lawn mower cutting deck 114 may be mounted to the lower side of the chassis 102, e.g., generally between the rear drive wheels 106 and the front wheels 108. The cutting deck 114 may include a housing forming a cutting chamber partially surrounding one or more rotatable cutting blades (not shown) as is known in the art. While shown as a mid- or belly-mount deck, other embodiments may position the deck in other locations, e.g., forward of the front wheels 108, aft of the rear wheels 106, lateral to the chassis 102, etc.

During operation, power is selectively delivered (e.g., by the prime mover 104) to the cutting deck 114 and the drive wheels 106, whereby the cutting blades rotate at a speed sufficient to sever grass and other vegetation as the deck passes over the ground surface 105. Typically, the cutting deck 114 has an operator-selectable height-of-cut mechanism to allow deck height adjustment relative to the ground surface 105.

Figure 2:
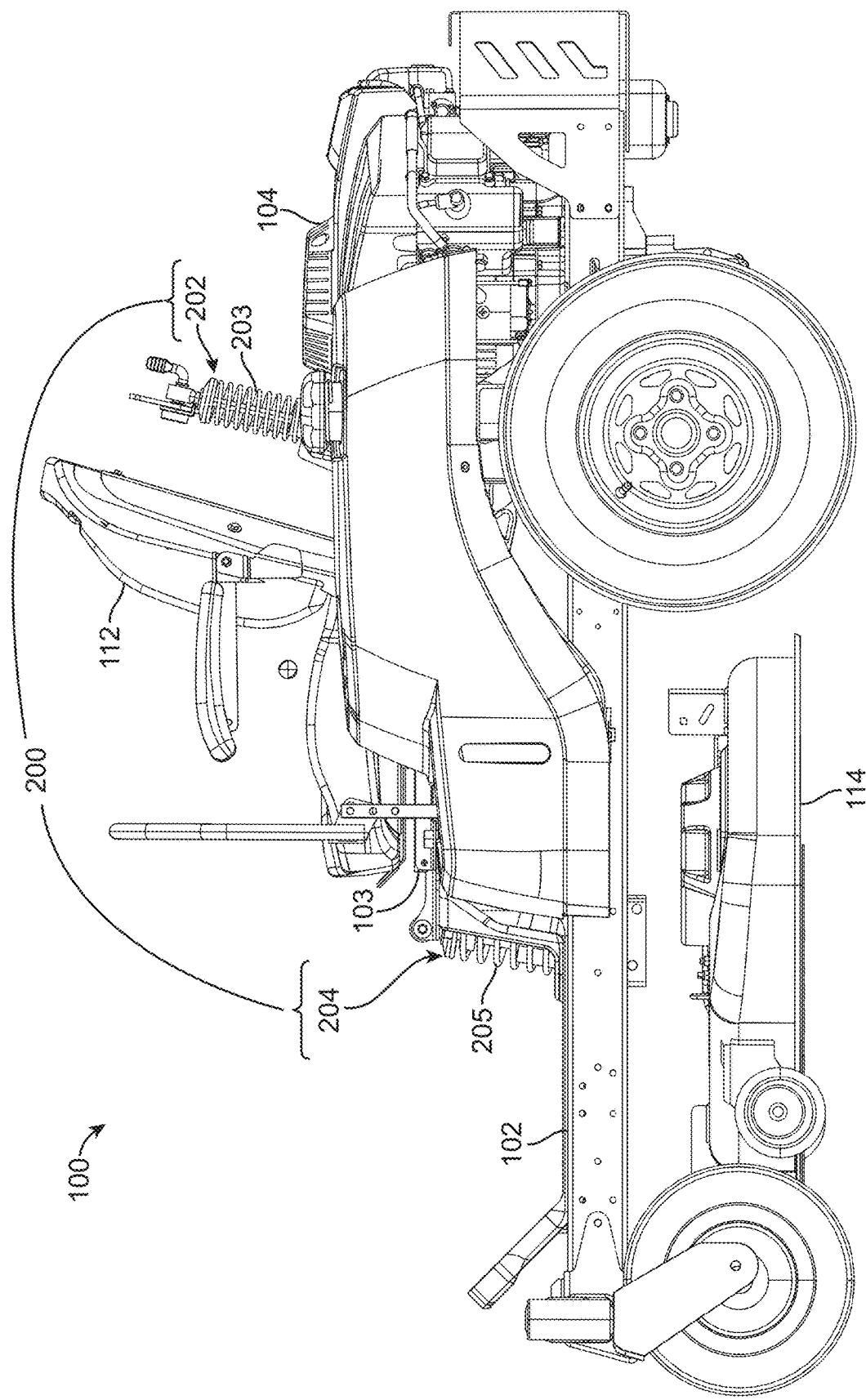
FIG. 2 is a side elevation view of the mower of FIG. 1 with some structure (deck support structure) removed.
Figure 5:
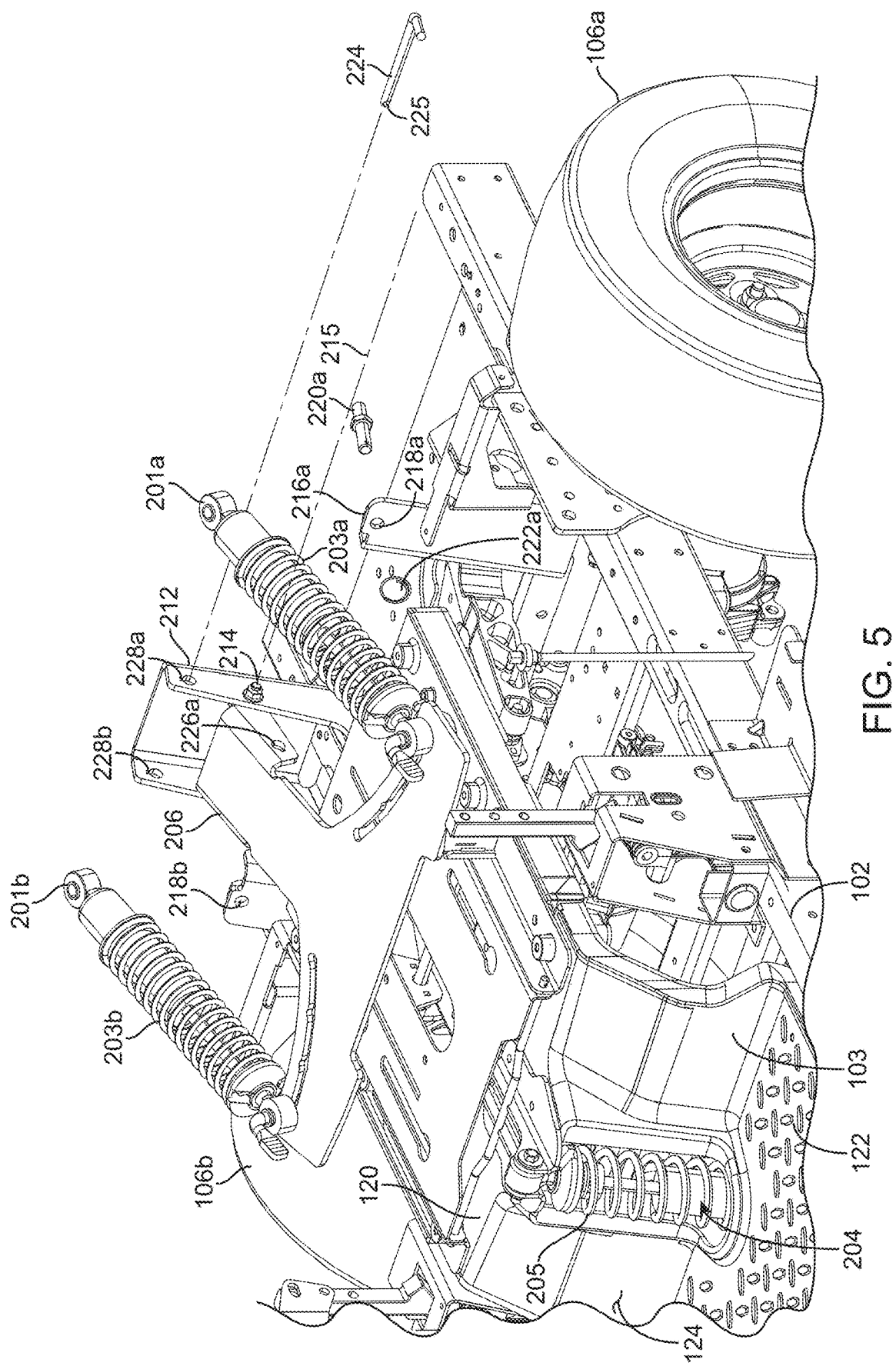
FIG. 5 is a partial perspective view of the mower of FIG. 4.

The support platform 103 may include both seat support portion 120 to which the seat 112 may couple, and a foot support portion 122 as shown in FIG. 5. A connecting structure 124 may connect the seat support portion to the foot support portion. As illustrated in the figures, the suspension system 200 may be operatively positioned between the chassis 102 and the support platform 103. As shown in FIGS. 1 and 2, the suspension system 200 may include a first suspension apparatus 202 and a second suspension apparatus 204. The first suspension apparatus 202 may be longitudinally positioned (i.e., positioned along the longitudinal axis 101) at or near a rear end of the support platform, with the second suspension apparatus 204 located more forwardly. The first suspension apparatus 202 may include at least one suspension unit or shock absorber 203. For example, the first suspension apparatus 202 may include two transversely-spaced suspension units or shock absorbers 203a, 203b as shown in FIG. 1. Moreover, the second suspension apparatus 204 may include at least one suspension unit or shock absorber 205.

The shock absorbers 203a, 203b may include a first or lower end 201 (201a, 201b; see FIG. 3) adapted to connect to the chassis 102, and a second or upper end 207 (207a, 207b; See FIG. 1) connected to structure (e.g., to a suspension tower 206), the latter connected to, and extending upwardly from, the support platform 103 (e.g., from the seat support portion 120). The tower 206 may define slots 208 that each receive the upper end 207 of their corresponding shock absorber 203 (e.g., slot 208a receives end 207a, slot 208b receive end 207b) as shown in FIG. 1. The ends 207 may selectively move along their respective slots 208 to any one of two or more locations within the associated slot 208 to effectively alter suspension characteristics of the mower 100 as described in more detail in U.S. Pat. No. 9,499,204. Except where indicated herein, the general construction and functionality of the suspension system 200 may be similar to corresponding systems described in the '204 patent.

Figure 3:
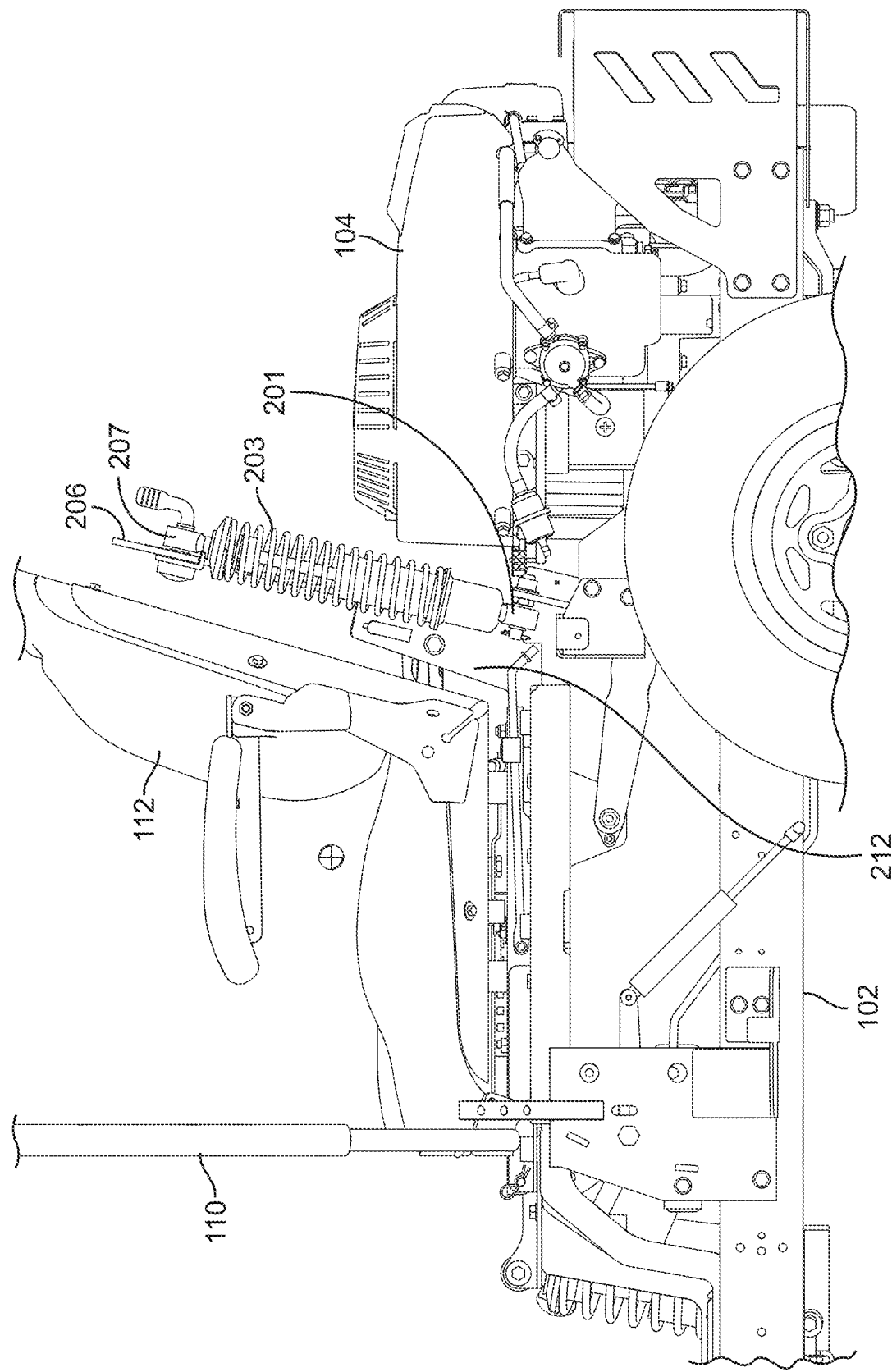
FIG. 3 is a partial side elevation view of the mower of FIG. 1.
Figure 4:
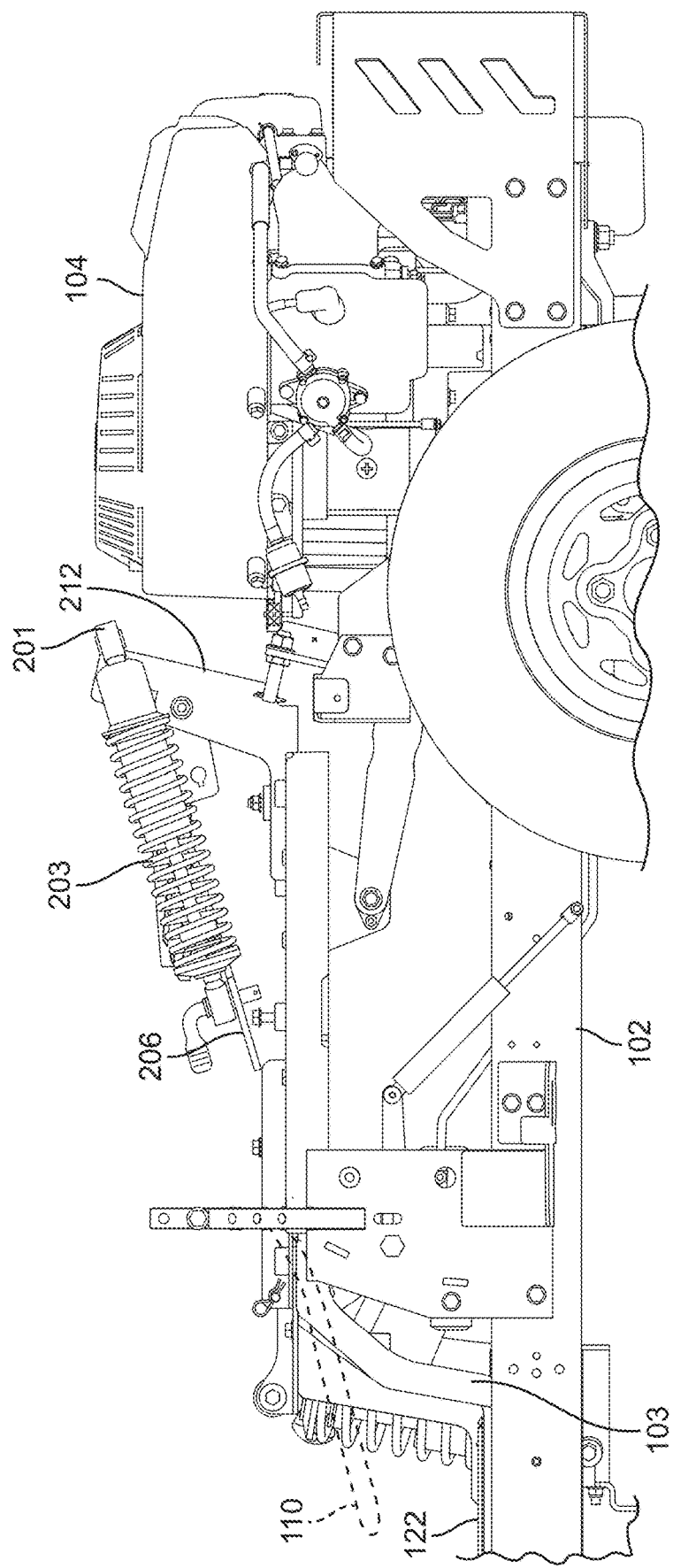
FIG. 4 is a partial side elevation views of the mower of FIG. 3, but with the suspension tower shown in a shipping position.

Unlike the suspension systems described in the '204 patent, however, the tower 206 of the present disclosure may move from an operating position (wherein an uppermost edge of the suspension tower is at a first elevation) as shown in FIGS. 1-3, to a transport or shipping position (wherein the uppermost edge is located at a second elevation lower than the first elevation as) shown in FIGS. 4-5. In the shipping position, the suspension system 200 (e.g., tower 206) may provide a vehicle profile that is lower as compared to the profile when the suspension system is in the operating position. As a result, the mower 100 may be packaged and shipped in a crate of smaller size (height) than may otherwise be possible if the tower 206 were fixed.

FIG. 3 shows a partial side elevation view of the mower when the tower 206 is in the operating position, while FIG. 4 shows a similar view with the tower in the shipping position. As shown in these views, the tower 206 may, in one embodiment, provide the two positions (transport and operating) by pivotally attaching to a mount 212 of the support platform 103 at a pivot joint. Of course, other embodiments may use relative movements other than pivoting (e.g., translation of the tower 206 relative to the support platform) to provide the desired operating and shipping positions.

As indicated in FIG. 4, other portions of the mower 100, e.g., the seat 112 and drive control levers 110, may be removed or otherwise moved to non-operating locations for shipping/transport. For instance, the seat 112 may be completely removed and attached to the foot support portion 122 of the platform 103 for shipping, while the drive control levers 110 may be partially detached from corresponding mower structure such that they fold forwardly as indicated in broken lines in FIG. 4 for shipping/transport.

FIG. 5 illustrates the tower 206 when in the shipping position. As shown in this view, the tower 206 may be pivotally attach to the support platform 103 (e.g. to the mount 212) to pivot about a transverse pivot 214 defining a pivot axis 215. Moreover, the lower ends 201 of the shock absorbers 203 may be disconnected from the chassis 102 to permit the tower 206 to reach the shipping position shown (again, the seat 112 (not shown in FIG. 5) may be moved/removed to provide space for the tower 206 to fold).

Figure 6:
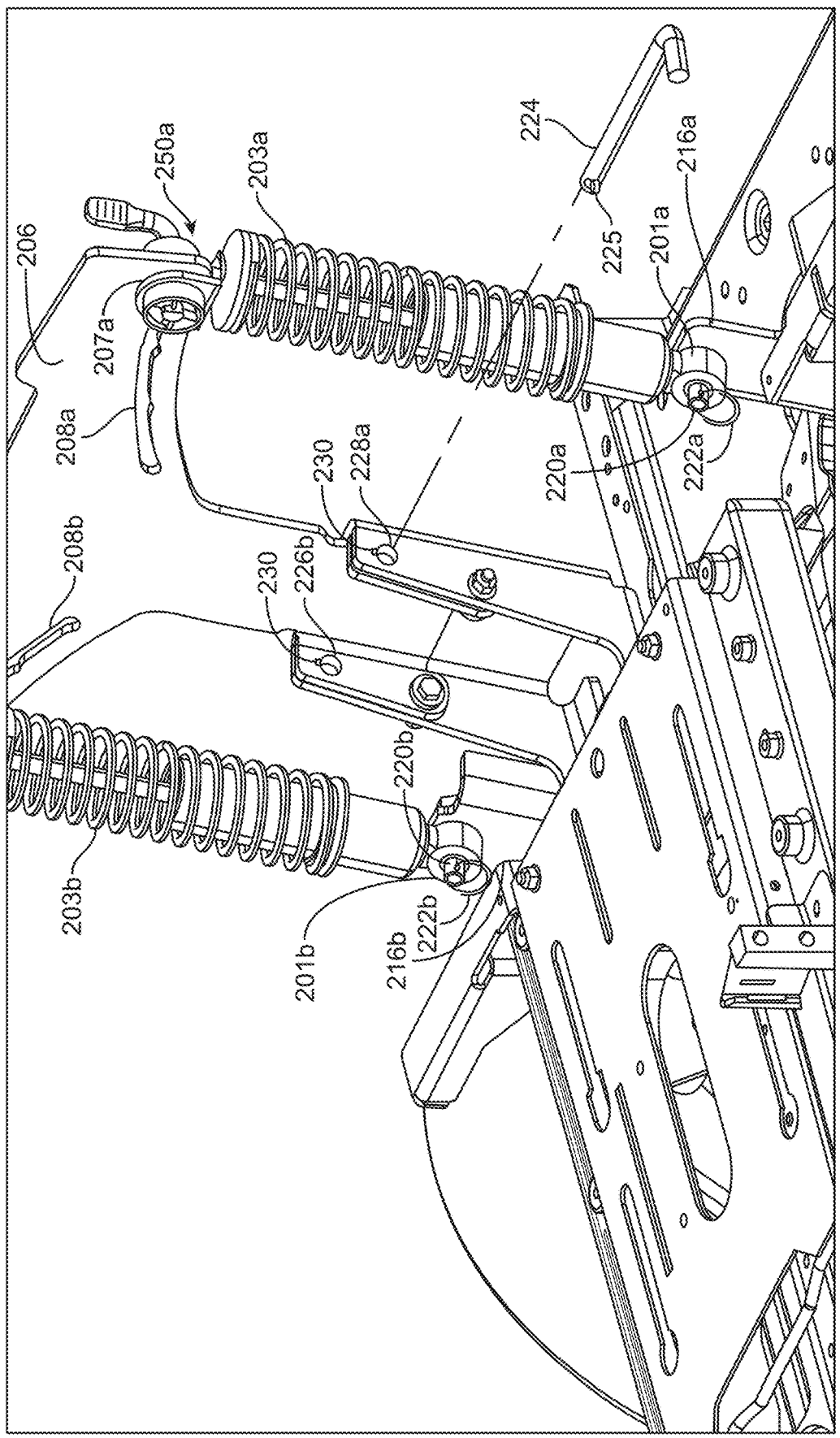
FIG. 6 is a partial perspective view of the mower of FIG. 4 showing the suspension tower during transition from the shipping position of FIG. 4 to the operating position of FIG. 3.

The mower may be crated and shipped with the tower 206 folded/collapsed as shown in FIGS. 4-5. Once the mower 100 is received (e.g., by a dealer, distributor, or end user), however, the mower (including the suspension tower 206) may be assembled and otherwise prepared for operation. To assemble the suspension system 200, the tower 206 may first be moved (pivoted about the pivot 214) from the shipping position shown in FIG. 5 to the operating position shown in FIG. 6. Once the tower 206 is in the operating position, the lower ends 201 of the shock absorbers 203 may be connected to receiving portions 216 of the chassis 102 as shown. In one embodiment, each lower end 201 defines an aperture that may be aligned with an aperture 218 (see FIG. 5) of the associated receiving portion 216 of the chassis 102. Once so aligned, a pin 220 may be inserted through the aligned apertures and secured in place with a retainer (e.g., cotter pin or ring 222) as shown in FIG. 6.

To pivotally secure the tower 206 relative to the mount 212, a lock pin 224 may be provided. The lock pin 224 may, in some embodiments, include a radial protruding key 225 at a distal end. Holes 226, 228 in the tower 206 and mount 212, respectively, may align and include a corresponding keyway 230 that permits the pin 224 to pass through the aligned holes when the key 225 is correctly indexed. However, once the pin 224 is completely inserted, it may be rotated such that the pin 224 may no longer be withdrawn without first rotating the pin until the key 225 again aligns with the keyway 230. Accordingly, the suspension system may, in some embodiments, be assembled (e.g., secured in the operating position) without the use of tools.

Suspension systems like those illustrated and described in the '204 patent may utilize a latch at the upper ends of each of the left and right shock absorbers that secures, relative to the slot in the tower, via clamping. While effective, such a latch may require initial, as well as periodic, adjustment to ensure adequate clamping force is maintained.

Figure 7:
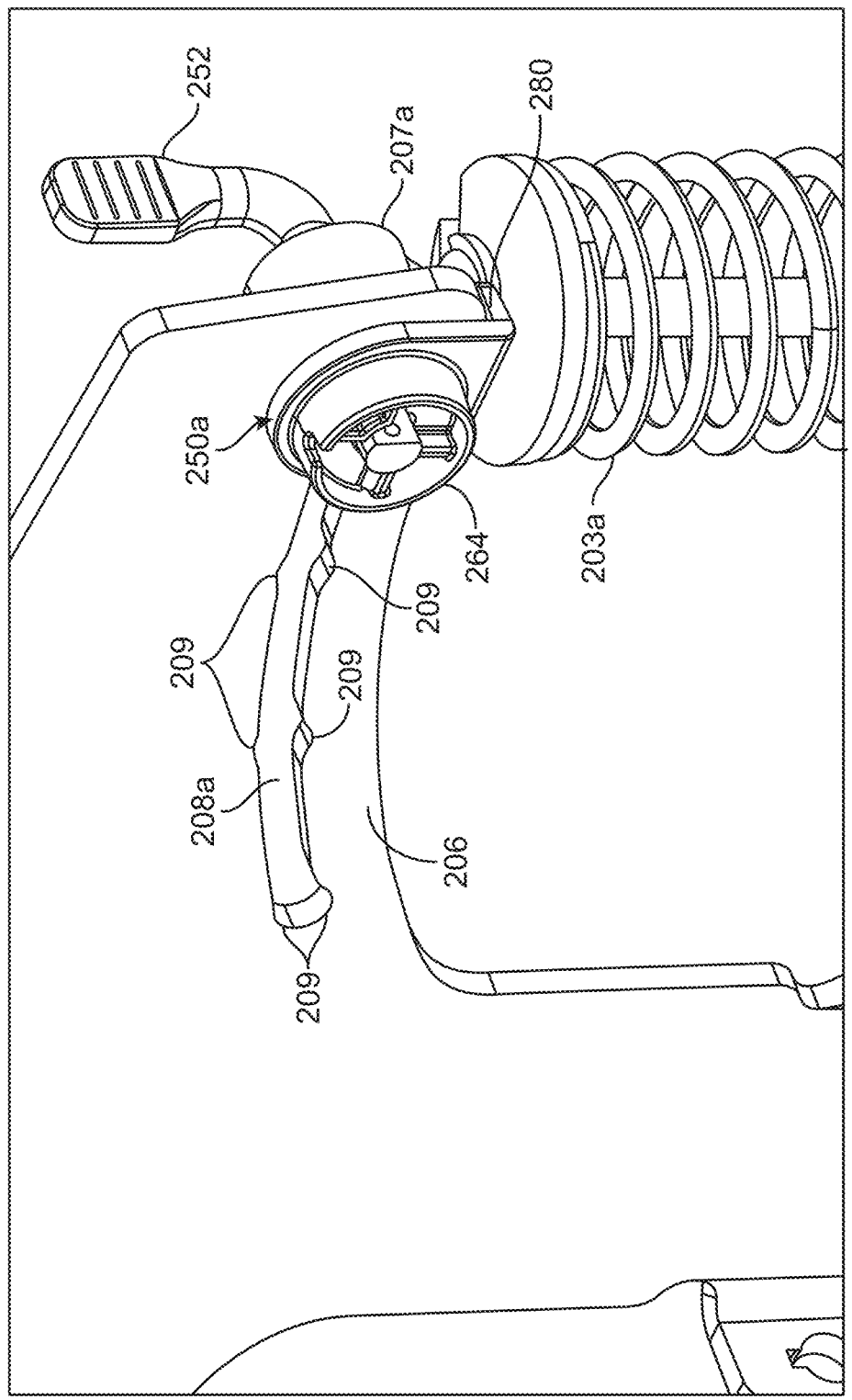
FIG. 7 is a partial perspective view of a suspension system latch in accordance with embodiments of this disclosure.

The upper ends 207 of the shock absorbers 203 of the present disclosure may similarly utilize a latch 250 (e.g., latch 250a, 250b) as shown in FIG. 7. Like the latch described in the '204 patent, each latch 250 may selectively immobilize the upper end 207 of its respective shock absorber 203 at any one of a plurality of locations situated along the corresponding slot 208. In embodiments of the present disclosure, however, immobilization is achieved by positive engagement of the latch 250 with corresponding features (e.g., notches or recesses 209 described below) defined within walls of the slot 208, thereby permitting the upper end 207 of the associated shock absorber to be secured in place along the slot. As a result, the latch 250 may be simpler to assemble and adjust, and may require less periodic maintenance, as compared to compression or clamping-style latches. Moreover, by interacting with discrete features provided in the walls of the slot, the latch 250 may ensure discrete positioning of the upper end 207 of each shock absorber 203 along its respective slot 208 by only being latchable when at one of these predetermined locations. Once again, while assembly and adjustment of the suspension system 200 is described herein with respect to the shock absorber 203a, it is understood that the other shock absorber 203b would assemble/adjust in the same or similar fashion.

Figure 8:
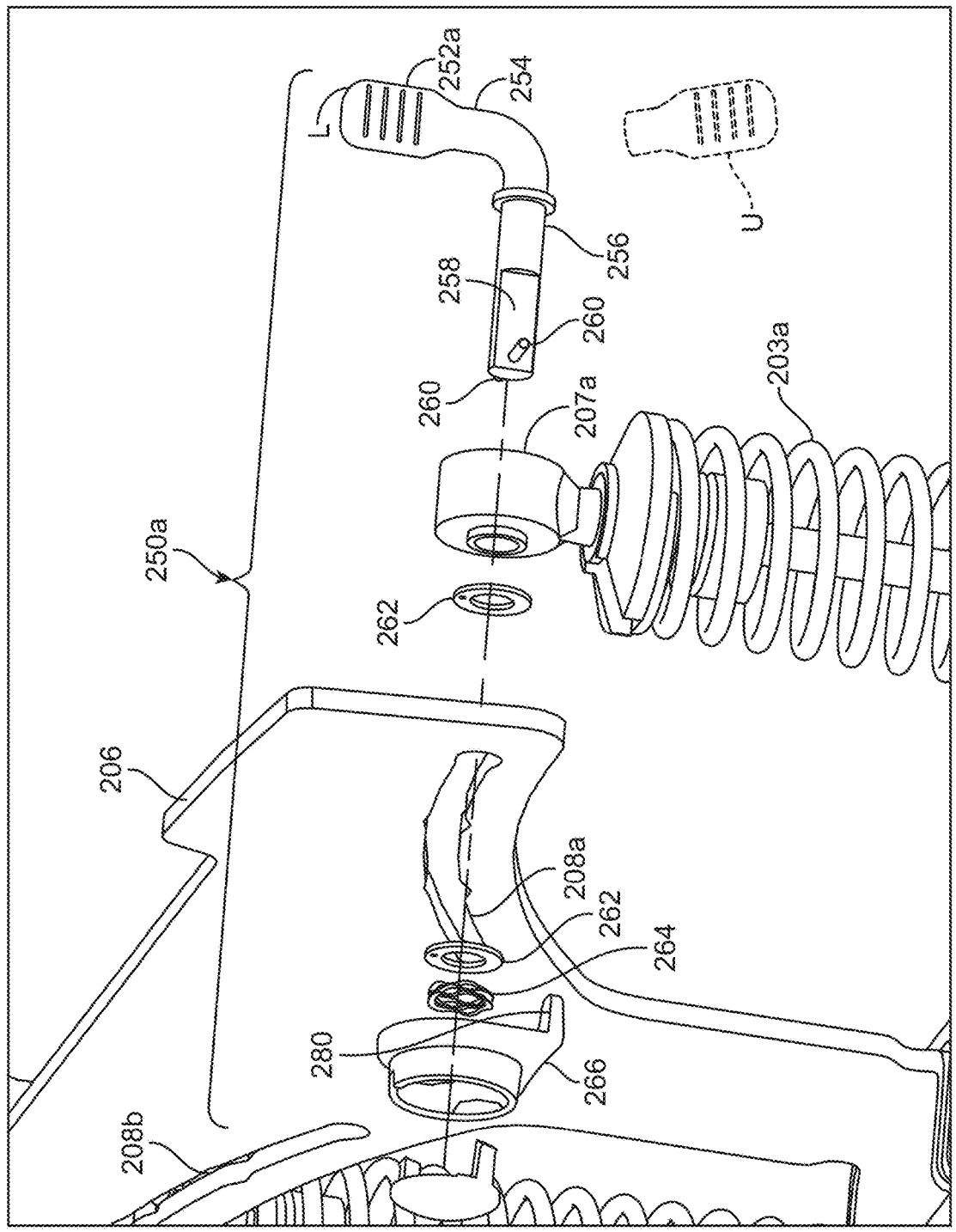
FIG. 8 is an exploded view of the latch of FIG. 7.

FIG. 8 is a view of the exemplary latch 250a exploded from the tower 206. As shown in this view, each latch 250 may include a lever 252 that includes both a handle portion 254 and a shaft portion 256, the latter forming a proximal end (adjacent the handle portion) and a distal end. The shaft portion 256 may extend through the slot 208 and be defined by a cylindrical first segment, and a second segment that, in some embodiments, is formed by an external flat 258 to form a D-shaped cross section. While shown with a single flat, other embodiments may provide other cross sections within the scope of this disclosure (e.g., two opposite flats to produce a "Double D" cross section). For reasons explained below, a cross pin 260 (extending normal to an axis of the shaft portion) may be provided at or near the distal end of the shaft portion 256.

To allow the latch 250/upper end 207 of each shock absorber 203 to slide relative to the tower 206, each latch 250 may also include a washer 262 (e.g., a polymeric or other friction-reducing washer) on each side of the tower. A wave- or other type of spring-washer 264 may also be provided to provide axial tension to the shaft portion 256 during latch operation.

Figure 9:
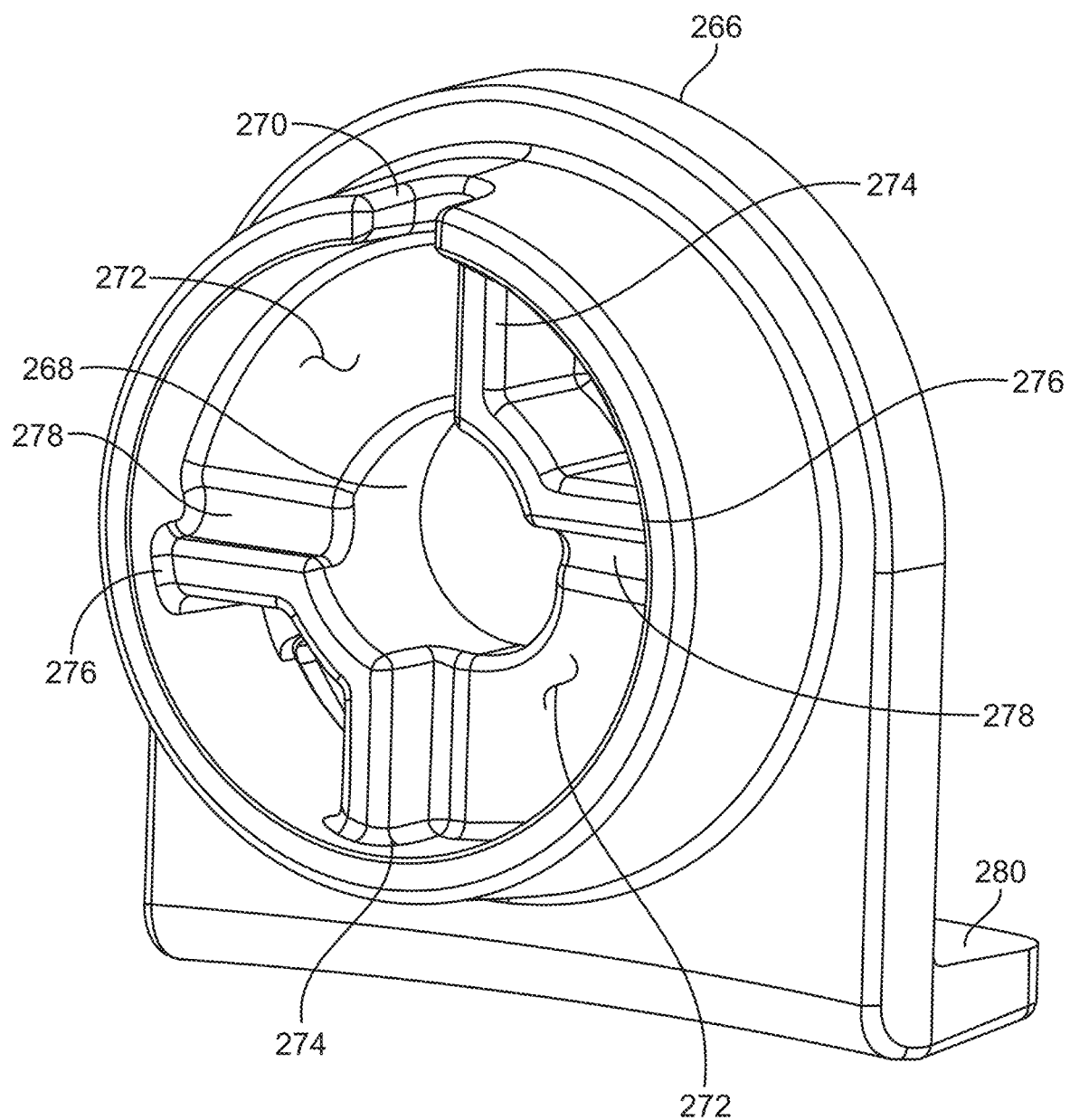
FIG. 9 is a perspective view of a cam lock of the latch of FIGS. 7 and 8.

Each latch 250 may further include a cam lock 266, an embodiment of which is shown in greater detail in FIG. 9. The cam lock is adapted to receive the shaft portion 256 and retain the lever 252 via interaction with the cross pin 260 as further described below.

As shown in FIG. 9, the cam lock 266 includes an aperture 268 to receive the distal end of the shaft portion 256 of the lever. Once the lever 252 is inserted through the upper end 207 of the shock absorber 203 (see FIG. 8), the washers 262, spring washer 264, and the cam lock 266, the cross pin 260 may be inserted into the shaft portion 256 via a notch 270 formed in a wall of the cam lock. The cross pin 260 may be retained within the shaft portion 256 via an interference fit.

When inserted into the lever 252, the cross pin 260 may protrude from each side of the shaft portion (transverse to an axis of the shaft portion) as shown in FIG. 8 (note that FIG. 8 illustrates the cross pin installed in the lever 252 before the lever is inserted into the cam lock 268. In practice, the cross pin would not be inserted until after the lever is passed through the cam lock). The cam lock 266 may provide two cam surfaces 272 along which the cross pin may slide as the lever 252 is rotated. To limit rotation of the lever 252, the cam lock 260 may also include stop surfaces 274 and 276 that, in the illustrated embodiment, allow 90 degrees of lever rotation.

The cam surfaces 272 are sloped such that the cross pin 260 rises (i.e., moves away from the tower 206) as the lever 252 rotates from an unlocked state (abutting stop surfaces 274) to a locked state (abutting stop surfaces 276). The cam surfaces 272 at or near the stop surfaces 276 may include a recess or detent 278 in which the cross pin 260 may sit when the lever 252 is in the locked state. The spring washer 264 (see FIG. 8) may bias the cross pin 260 such that it remains in the detent 278 until positively displaced by the operator via rotation of the lever 252. The locked and unlocked states of the lever 252a may thus correspond to a first or latched position "L" and a second or unlatched position "U" of the shaft portion 256/latch 250, respectively, as shown in FIG. 8.

Figure 10:
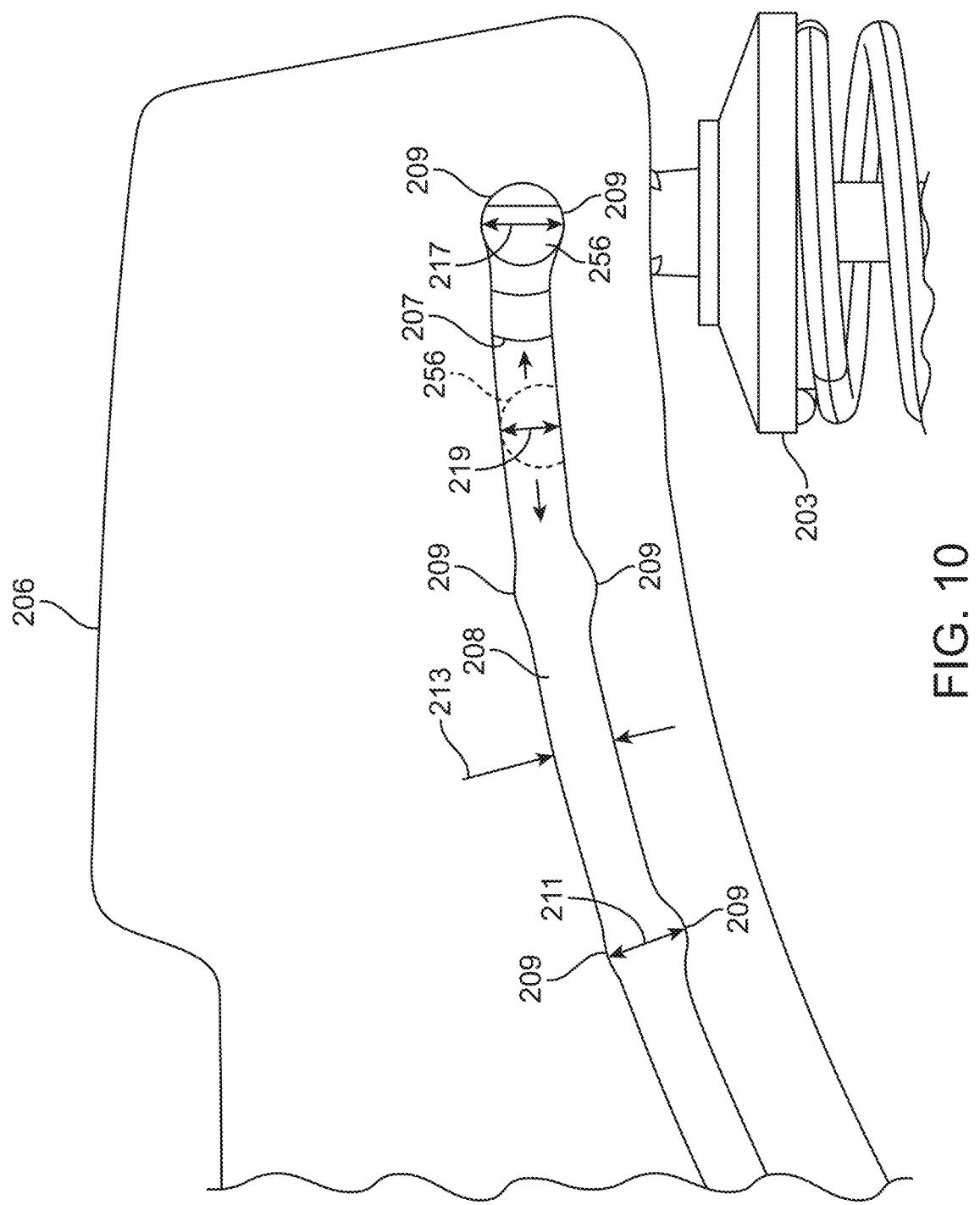
FIG. 10 illustrates an end view of the tower and of a shaft portion of the latch shown in FIGS. 7 and 8, wherein the shaft portion is shown both in a latched position (solid lines) and an unlatched position (broken lines)

FIG. 10 illustrates a partial front view of a portion of the tower 206 when the lever 252 is in the locked state (note that cross pin 260, cam lock 266, and spring washer 264 are removed in this view). The slot 208 may include notches or recesses 209 formed in the wall of the slot at predetermined locations along the slot (e.g. a pair of opposing recesses at each location). As is visible in FIG. 10, a maximum width 211 measured at each of the recesses 209 may be larger than a maximum width 213 measured elsewhere along the slot. Moreover, the first segment of the shaft portion 256 may have a maximum cross-sectional dimension 217 measured across a full diameter of the shaft portion, while the second segment has a minimum cross-sectional dimension 219 measured normal to the flat 258 as indicated in FIG. 10. The dimension 217 (i.e., the diameter of the shaft portion 256) may be larger than the maximum width 213 of the slot 208, but slightly smaller than the maximum width 211 at the recesses 209. Still further, the minimum cross-sectional dimension 219 of the shaft portion 256 may be smaller than both the maximum width 211 of the recess 209 and the maximum width 213 of the slot 208.

As a result of this construction, the upper end 207 of each shock absorber 203 may translate or slide along its respective slot 208 when the lever is in an unlocked state (e.g., when the shaft portion is in the second position U as shown in the broken line rendering of shaft portion 256 in FIG. 10), and be immobilized within the slot (e.g., by engaging any one of the sets of recesses 209) when the lever is in the locked state (e.g., e.g., when the shaft portion is in the first position L as shown in the solid line rendering of shaft portion 256 in FIG. 10). Stated alternatively, the latch is movable between: the latched position, wherein the maximum cross-sectional dimension of the shaft portion engages the slot to immobilize the latch relative to the tower; and an unlatched position, wherein the minimum cross-sectional dimension of the shaft portion engages the slot to allow movement of the latch along the slot.

If the operator of the mower wishes to adjust a suspension characteristic of the suspension system 200, the upper ends 207 of each of the left and right shock absorbers 203a, 203b may be repositioned by first rotating the handle portion 254 of each lever 252 by 90 degrees (e.g., rotating the shaft portion 256 from the first position L to the second position U in FIG. 8). As the lever rotates, the shaft portion 256 will rotate from the locked position shown in solid lines in FIG. 10, to the unlocked position shown in broken lines. Once the lever 252 is in the unlocked state, the upper end of respective shock absorber 203 may be slid along the slot 208 until it is located at the new desired recess 209. The recesses 209 may be identified by various indicia (not shown) so that the operator can separately locate each of the left and right shock absorbers 203 at generally the same angular orientation. Moreover, due to the physical shape of the recesses 209 and the shaft portion 256, the operator may receive tactile feedback indicating when the shaft portion reaches the various recesses.

Once the shaft portion 256 has reached the desired recess 209, the operator may again rotate the handle portion 254 of the lever 252 (e.g., from the position U to the position L in FIG. 8), causing the shaft portion 256 of the lever to rotate until the profile of the shaft portion engages the adjacent enlarged recesses 209, effectively locking the upper end 207 of the respective shock absorber 203 in place.

The cam surface 272 and detents 278 of the cam lock 266, as well as the biasing force of the spring washer 264 (see FIG. 8) may maintain the lever 252 in the locked state, and thus the shock absorber 203 in the desired location. As shown in FIGS. 7 and 8, the cam lock 266 may further include a guide surface 280 that engages a surface of the tower 206 as shown in FIG. 7 to reduce or even eliminate inadvertent rotation of the cam lock 266 relative to the tower during lever 252 rotation/movement.

While shown as a "twist-to-lock" latch in FIGS. 1-10, other latches are also contemplated. For example, FIGS. 11 and 12 illustrate a latch that is activated through axial displacement of the shaft portion rather than rotation.

Figure 11:
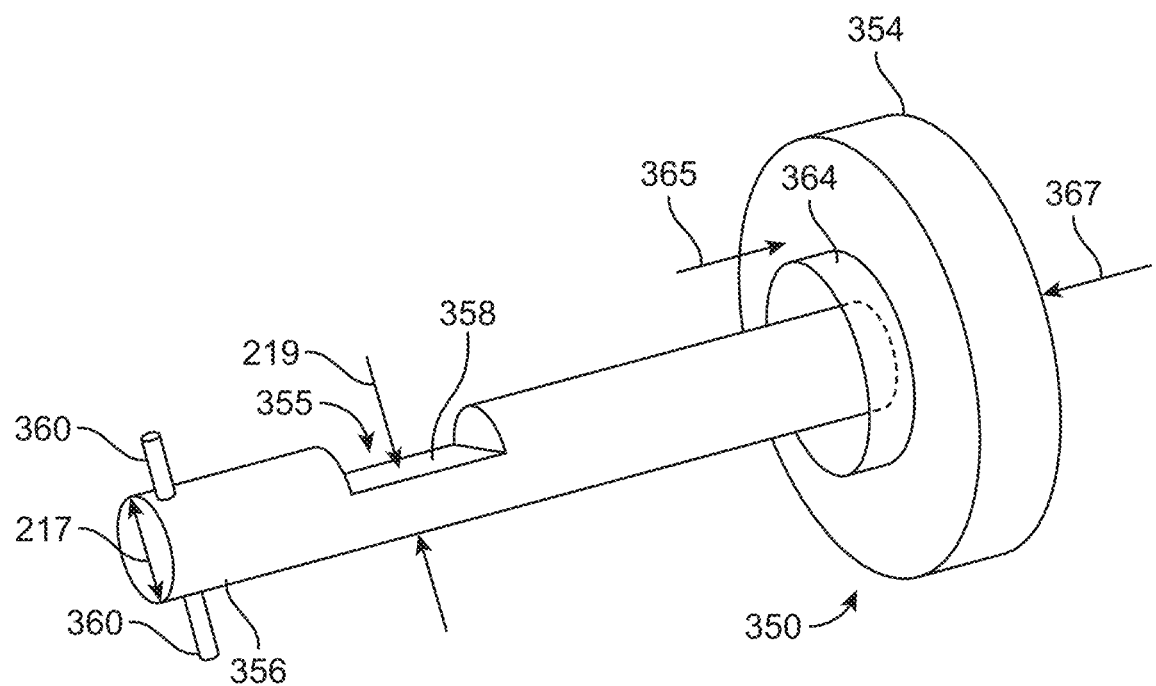
FIG. 11 illustrates a latch in accordance with another embodiment of the disclosure.
Figure 12:
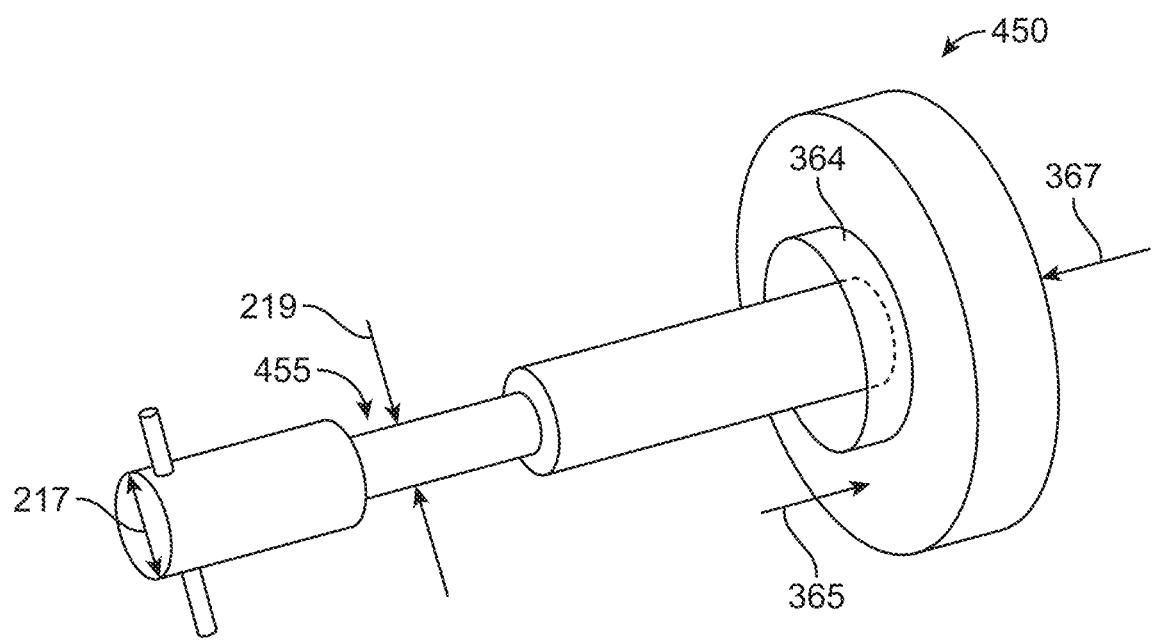
FIG. 12 illustrates a latch in accordance with still another embodiment of the disclosure.

FIG. 11 illustrate a latch 350 that may generally replace the latch 250 in FIGS. 1-10. The latch 350 may include a button portion 354 and a shaft portion 356. A biasing member, e.g., spring 364, may also be provided to bias the button portion, and thus the shaft portion in the direction 365. Like the latch 250, the latch 350 may also include a cross pin 360 that may interact with a latch plate (not shown). The purpose of the cross pin 360, however, may be simply to restrict the latch from axially separating from the suspension system (i.e., it does not interact with cam surfaces like the cross pin 260 described above, but merely acts as a retainer to restrict axial movement of the latch 350).

The shaft portion 356 may be mostly cylindrical in shape, except for a reduced segment 355, which in one embodiment is defined by a flat 358 formed in the shaft portion. A cross section taken normal to an axis of the shaft portion 356 at the flat 358 is similar to the D-shaped section formed by the flat 258 of the shaft portion 256. Similarly, a circular cross section is present at a segment of the shaft portion taken normal to the axis of the shaft portion immediately adjacent the flat 358. The circular cross section may have a maximum cross-sectional dimension 217 measured across a full diameter of the shaft portion 356, and a minimum cross-sectional dimension 219 measured normal to the flat 258 as indicated in FIG. 11. At rest, the biasing force of the spring 364 pushes the latch 350 in the direction 365, causing the circular cross section to be aligned with (engaged with) the slot 208 (not shown, but see FIG. 10). In this locked position, the latch 350 may latch the shock absorbers 203 at any one of the notches 209 (see again, FIG. 10).

When the operator wishes to move the shock absorber to another notch 209 along the slot, a force 367 may be applied to the button portion 354 sufficient to overcome the biasing force of the spring 364. This causes the shaft portion 356 to translate or slide axially in the direction of the force 367 until the flat 358 is aligned with the slot 208. At this point, the operator may move the latch (and thus the second end of the associated shock absorber 203) within the slot in the same manner as described above with reference to FIG. 10. Upon reaching the desired notch 209, the biasing force of the spring 364 may cause the shaft portion 356 to displace in the direction 365, thereby engaging the full circular cross section of the shaft portion with the slot, effectively latching the latch/shock absorber 203 in place.

Due to actuation of the latch 350 via axial translation (rather than rotation as with the latch 250), the latch 350 does not require the camming action provided by the cam washer 264 (see FIG. 9). Rather, the latch 350 may substitute a latch plate in place of the cam washer that merely serves to retain the latch 350 in place via abutment interaction with the cross pin 360 (i.e., no cam surfaces analogous to the cam surfaces 272 (see FIG. 9) are necessary).

While shown as having a flat 358 formed therein, FIG. 12 illustrates a latch 450 similar to the latch 350. However, instead of having the segment with a flat formed therein and the corresponding D-shaped cross section, the latch 450 simply substitutes a necked-down cylindrical segment 455 to provide the minimum cross-sectional dimension 219.

As one of skill may thus appreciate, most any latch shape that provides the two (maximum and minimum) cross-sectional dimensions 217, 219 may be possible within the scope of this disclosure.

The complete disclosure of the patents, patent documents, and publications cited herein are incorporated by reference in their entirety as if each were individually incorporated. In the event that any inconsistency exists between the disclosure of the present application and the disclosure(s) of any document incorporated herein by reference, the disclosure of the present application shall govern.

Illustrative embodiments are described, and reference has been made to possible variations of the same. These and other variations, combinations, and modifications will be apparent to those skilled in the art, and it should be understood that the claims are not limited to the illustrative embodiments set forth herein.

What is claimed is:
1. A work vehicle comprising:
  a chassis supported upon a ground surface by ground contact members, the chassis defining a front end, a rear end, and a longitudinal axis extending between the front and rear ends;
  a support platform adapted to support an operator; and
  a suspension system comprising a suspension tower movable between: an operating position, wherein the suspension system is operatively connected to the chassis and the support platform; and a shipping position, wherein the suspension system is operatively disconnected from one of the chassis and the support platform.

2. The vehicle of claim 1, wherein the suspension tower is located: at a first elevation when in the operating position; and at a second elevation, less than the first elevation, when the suspension tower is in the shipping position.

3. The vehicle of claim 1, wherein the suspension system further comprises at least one shock absorber having a first end connected to the chassis when the suspension tower is in the operating position, and a second end connected to the suspension tower.

4. The vehicle of claim 3, wherein the second end of the shock absorber is adapted to connect to the suspension tower at any one of two or more locations.

5. The vehicle of claim 3, wherein the suspension tower defines a slot, and wherein the second end of the shock absorber is movable along the slot.

6. The vehicle of claim 5, further comprising a latch adapted to selectively immobilize the second end of the shock absorber at any one of a plurality of locations along the slot.

7. The vehicle of claim 5, wherein the latch comprises a shaft portion movable between first and second positions, wherein: in the first position, the shaft portion is adapted to slide along the slot; and, in the second position, the shaft portion is adapted to engage a notch selected from a plurality of notches formed in a wall of the slot.

8. The vehicle of claim 7, wherein the shaft portion is rotatable between the first and second positions.

9. The vehicle of claim 7, wherein the shaft portion is translatable between the first and second positions.

10. The vehicle of claim 7, wherein the shaft portion comprises a segment having a D-shaped cross section.

11. The vehicle of claim 1, wherein the support platform comprises a seat support portion adapted to support an operator seat, and wherein the suspension tower is connected to the seat support portion.

12. The vehicle of claim 1, wherein the suspension tower is attached to the support platform at a pivot joint, and wherein the suspension tower is adapted to move between the operating position and the shipping position via pivoting about the pivot joint.

13. A work vehicle comprising:
a chassis supported upon a ground surface by a plurality of wheels;
a support platform adapted to support an operator; and
a suspension system comprising:
a suspension tower connected to the support platform; and
a shock absorber having a first end adapted to connect to the chassis, and a second end connected to the suspension tower;
wherein the suspension tower is movable, relative to the support platform, between:
an operating position, wherein the first end of the shock absorber is connected to the chassis; and
a shipping position, wherein the first end of the shock absorber is disconnected from the chassis.

14. The vehicle of claim 13, wherein an uppermost edge of the suspension tower is located: at a first elevation when the tower is in the operating position; and at a second elevation lower than the first elevation when the tower is in the shipping position.

15. The vehicle of claim 13, wherein the suspension tower moves between the operating position and the shipping position by pivoting relative to the support platform.

16. The vehicle of claim 13, wherein the support platform comprises a seat support portion, and wherein the suspension tower is connected to the seat support portion.

17. The vehicle of claim 13, wherein the suspension tower defines a slot, and wherein the second end of the shock absorber is selectively movable along the slot.

18. The vehicle of claim 17, further comprising a latch adapted to selectively immobilize the second end of the shock absorber at any one of two or more discrete locations along the slot.

19. The vehicle of claim 17, wherein the slot further comprises a wall defining two or more notches.

20. The vehicle of claim 19, further comprising a latch connected to the second end of the shock absorber, the latch adapted to selectively engage any one of the two or more notches to immobilize the second end of the shock absorber relative to the suspension tower.

21. The vehicle of claim 13, further comprising a second shock absorber having a first end adapted to connect to the chassis, and a second end connected to the suspension tower.

22. An adjustable suspension system comprising:
a structure defining a slot;
a shock absorber having an end; and
a latch associated with the end of the shock absorber, wherein the latch is adapted to secure the end of the shock absorber at any one of a plurality of locations along the slot;
wherein the latch comprises a shaft portion extending through the slot, the shaft portion comprising a first segment defined by a maximum cross-sectional dimension and a second segment defined by a minimum cross sectional-dimension, and wherein the latch is movable between: a latched position, wherein the maximum cross-sectional dimension engages the slot to immobilize the latch relative to the structure; and an unlatched position, wherein the minimum cross-sectional dimension engages the slot to allow movement of the latch along the slot.

23. The system of claim 22, wherein the second segment comprises an external flat formed on the shaft portion, and wherein the minimum cross-sectional dimension is measured normal to the flat.

24. The system of claim 22, wherein the second segment comprises a necked-down section of the shaft portion, the necked-down section forming the minimum cross-sectional dimension.

25. The system of claim 22, wherein the latch is moved between the latched position and the unlatched position via axial displacement of the shaft portion.

26. The system of claim 22, wherein the latch is moved between the latched position and the unlatched position via rotation of the shaft portion.

* * * * *